United States Patent

[11] 3,611,278

[72] Inventors Norman J. Guinzy
Austin;
William H. Ruehle, Duncanville, both of Tex.
[21] Appl. No. 842,523
[22] Filed July 17, 1969
[45] Patented Oct. 5, 1971
[73] Assignee Mobil Oil Corporation

[54] INTERVAL VELOCITY DETERMINATION
6 Claims, 10 Drawing Figs.
[52] U.S. Cl. .................................................. 340/15.5
[51] Int. Cl. .................................................. G01v 1/00
[50] Field of Search .................................................. 340/15.5

[56] References Cited
UNITED STATES PATENTS
3,417,370 12/1968 Brey .............................. 340/15.5

Primary Examiner—Rodney D. Bennett, Jr.
Assistant Examiner—H. A. Birmiel
Attorneys—William J. Scherback, Frederick E. Dumoulin, Arthur F. Zobal, Andrew L. Gaboriault and Sidney A. Johnson ABSTRACT: In geophysical exploration, a suite of seismograms is converted to values of interval velocity and dip for each of the subsurface layers. An iteration process fits an arbitrarily dipping Snell's Law layered model to the observed field seismograms. Use of the velocity model permits a migration of original data into its true spatial positions.

3,611,278

1

INTERVAL VELOCITY DETERMINATION

BACKGROUND OF THE INVENTION

This invention relates to geophysical exploration and more particularly to a process for converting field seismograms to the internal velocity and the dip of each subsurface layer.

In seismic exploration, the measurement of velocity is generally recognized as the major parameter in the processing and interpretation of seismograms. The determination of the acoustic velocity characteristics from seismograms is described in "Seismic Velocities From Subsurface Measurements," C. H. Dix, *Geophysics*, Vol. 20, pages 68–86, 1955.

Briefly, acoustic velocity is usually determined from seismograms by use of the relationship $$T_R = \sqrt{T_0^2 + X^2/V_a^2}$$

In the foregoing, $T_R$ is the travel time of a seismic wave traveling from a source to an interface and back to a surface receiver. This is the time of the reflection on the seismogram. $T_0$ is the ideal vertical travel from the surface of the earth to the reflection point. (This is also referred to as the reflection time at zero horizontal offset.) $X$ is the horizontal offset distance from the source to the receiver and $V_a$ is the acoustic velocity. While the term "average velocity" is commonly used, it is more accurate to state what is the RMS acoustic velocity. See "Dynamics Correlation Analysis," a paper by W. A. Schneider and Milo Backus, presented at the 36th Annual SEG Convention, Houston, Tex., 1966.

One technique which has recently been used to obtain average velocity from a suite of seismograms is described in the Brey U.S. Pat. No. 3,417,370. In a technique such as this, the field data includes a suite of seismograms each having horizontal offset one with respect to another along a line of exploration. These traces are time shifted one with respect to another based on different assumed values of average velocity. For each reflection, a correlation operation indicates the signal power between the traces for the different values of assumed average velocity. A maximum in the signal power indicates correct average velocity to that reflection. This can be carried out for each reflection on the suite of seismograms so that average velocity to each of these reflectors is determined.

There are improvements on this type of process in which a plurality of values of dip for each reflector are evaluated. That is, for each reflector, there is a search through all possible values of dip as well as velocity to determine the maximum signal power between the traces. This provides outputs representing the dip of each reflector as well as the average velocity to each reflector. Processes such as this will hereinafter be referred to as a VIP process, an acronym for velocity by integrated power.

Another processing technique for seismograms includes migration of each reflection point to its correct depth and horizontal position. Presently used migration techniques are employed to account for refraction of the ray path in a layered earth. Examples of migration techniques are described in *Exploration Geophysics*, published by Trija Publishing Co., 2nd Edition, 1950, Los Angeles, Calif., J. J. Jakosky, pages 670 and 688. Presently used migration methods employ a velocity which varies with depth only. Such methods do not properly treat velocity gradients such as arise in diverging layers.

SUMMARY OF THE INVENTION

The process of the present invention determines interval velocities by an iteration process which fits an arbitrarily dipping Snell's Law layered model to the field data.

Reflections on the seismograms are characterized by three parameters, their zero offset arrival time $T_0$, their apparent average velocity $V_a$, and their time dip $\Delta t$. That is, a set of reflections 1, 2, 3 ... $i$ can be characterized by the set of arrival times $T_i(X)$ and dips $\Delta T_i$. These parameters can be determined directly from the field seismograms by several processes but the aforementioned VIP-type processes are particularly suitable for this purpose. The present invention generates the interval velocity by fitting a dipping layered model to this data.

In addition, the migrated subsurface attitude of each reflector is obtained. The use of the velocity model permits the migration of the original data into its true spatial position.

DESCRIPTION OF A PARTICULAR EMBODIMENT

Before proceeding with a description of the process of this invention in conjunction with the flow sheet of FIG. 1, there will first be described what is being performed by the process. FIG. 2 shows a typical field layout for producing a suite of seismograms. In FIG. 2, seismic energy is generated at the shotpoints $S_1$, $S_2$ and $S_3$. The seismic traces are recorded at the receivers $R_1$, $R_2$ and $R_3$. Normally, of course, there will be many receivers to produce a suite of seismograms each having horizontal offset one with respect to another along the line of exploration. The particular type of field setup shown in FIG. 2 is a common-surface-point-recording system. The seismic reflections appearing on the suite of seismograms can be approximated by hyperbolic curves across the suite defined by:

$$\frac{X^2}{V_a^2} - T_0^2 = T_R^2$$

In the foregoing, $T_R$ is the arrival time of the reflection on a particular trace in the suite, $X$ is the horizontal offset of the particular trace, $T_0$ is the zero offset reflection time and $V_a$ is average or apparent velocity.

There are numerous techniques for obtaining apparent average velocity and the reflection time at zero offset. These two parameters are needed to normal moveout correct the suite of seismograms. The VIP-type of process for obtaining apparent velocity and zero offset reflection time will be briefly described with reference to FIGS. 7 and 8.

Figure 6:
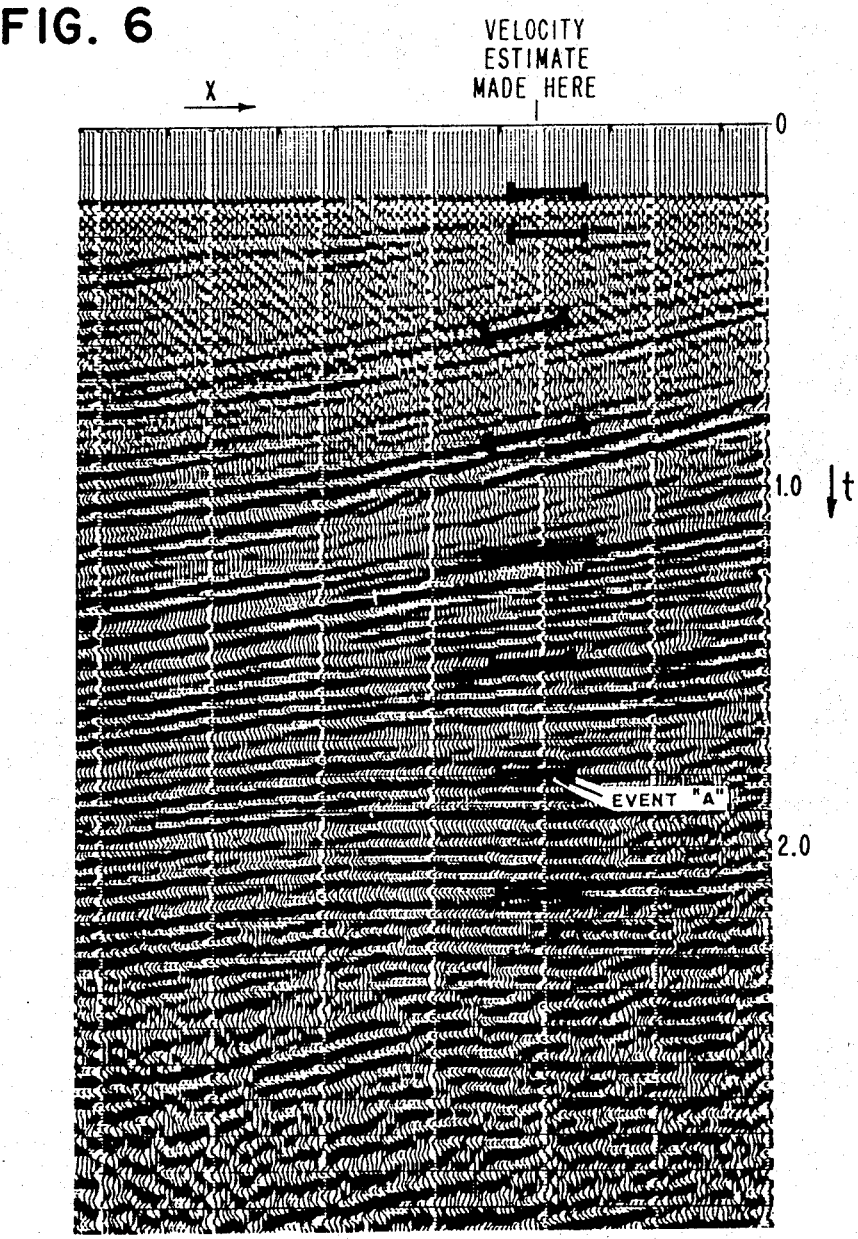
FIG. 6 shows a suite of field seismograms.

A suite of traces similar in appearance to that shown in FIG. 6 is obtained from a field layout. (FIG. 6 includes a number of traces each horizontally spaced one from the other. The ordinate in FIG. 6 is record time from 0 to about 3.0 seconds. The abscissa represents horizontal offset along the line of exploration.)

Figure 7:
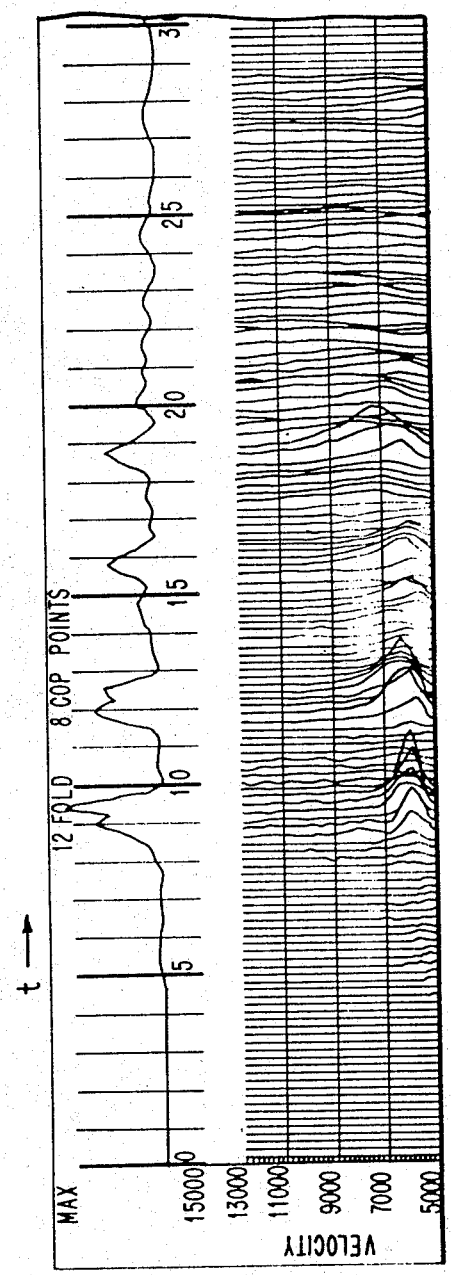
FIG. 7 depicts data obtained from a VIP-type process.

At each increment of record time, the traces are time shifted one with respect to another. This time shift (or normal moveout correction) is based upon an assumed value of velocity. Then, the signal power of all of the time-shifted traces is obtained for that value of assumed velocity. One technique for doing this is to obtain the zero lag cross-correlation function of all traces. The value of the zero lag cross-correlation function is obtained for each assumed value of velocity. As shown in FIG. 7, the value of average velocity has been iterated through a plurality of values between 5,000 and 13,000 feet per second. FIG. 7 shows a plurality of signal-power curves, one signal-power curve for each of a plurality of record times. Peaks in the signal-power curve indicate the correct value of assumed apparent velocity for a particular reflector. In FIG. 7, it will be noted that there are several reflectors having an apparent velocity indicated to be between 5,000 and 7,000 feet per second.

The single curve of FIG. 7 is a plot of the maximum in the signal-power curves. This is a good indication of the zero offset time of a plurality of reflecting layers in the subsurface.

In addition to searching through all values of velocity and vertical travel time as indicated by the output data of FIG. 7, a process of this type can also search through a series of assumed values of dip, both positive and negative. These components of dip can be expressed either in terms of the assumed dipping angle, that is, various values of angle, or they can be expressed in terms of the time shift between the first and last traces in the suite.

Figure 8:
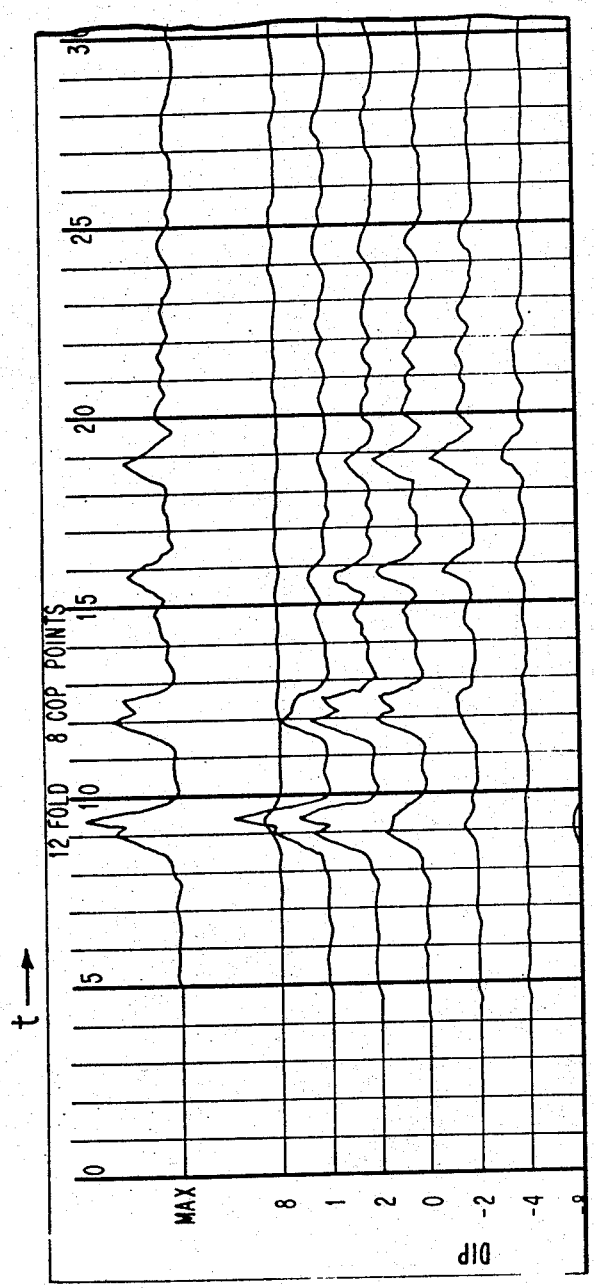
FIG. 8 depicts data obtained from a VIP-type process which includes a dip search.

FIG. 8 is a plot of the total energy curves, each similar to the single curve of FIG. 7, for each of a plurality of assumed values of dip. In this case, the dip has been expressed as total time shift between adjacent common depth points. From this information, the approximate dip of each seismic reflection can be determined.

While the output of a VIP-type process has been depicted pictorially in FIGS. 7 and 8, it will be understood that the outputs will normally be digitized and available to be used as an input to a process such as that of the present invention. From a process of the type described above, there is available seismic data including the zero offset arrival times $T_0$ of reflections, the apparent velocity $V_a$ for each reflection and the time dip $\Delta t_n$ of each seismic reflection. From this data, the process of the present invention generates the interval velocity for each layer and a more accurate determination of dip. In addition, the migrated horizontal and vertical displacement of each reflector is obtained. This is accomplished by generating a model of the ray path taken through the succeeding layers and comparing it to the observed field data to obtain the best model. This is done layer by layer.

Figure 3A:
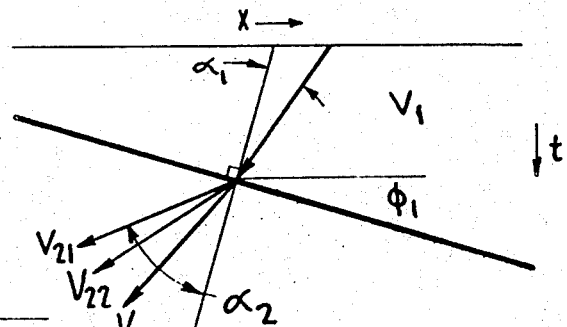
FIG. 3a shows ray diagrams.
Figure 3B:
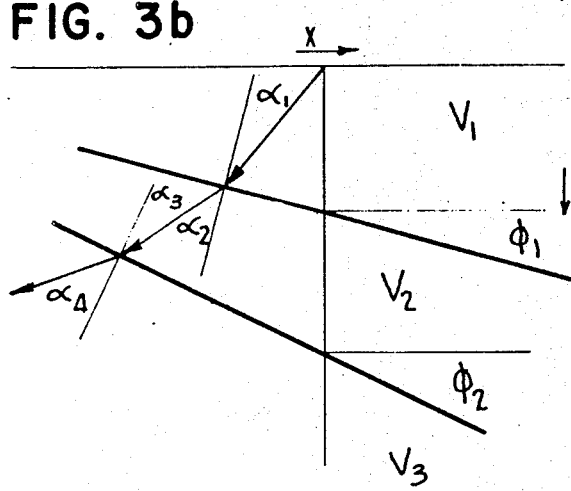
FIG. 3b shows ray diagrams.

Consider the first layer in conjunction with FIGS. 3a and 3b. The interval velocity $V_1$ of the first layer is determined precisely from:

$V_1 = V_a \cos \Phi_1$

The average velocity $V_a$ to the first reflector is known from the output of the preceding VIP process. This process also specifies the dip $\Phi_1$ (or $\Delta t/X$) for the first layer. From the dip and the velocity of the first layer, the direction of the ray path in the first layer is specified. The zero offset time $T_0$ from the VIP process specifies the thickness of the layer.

Having obtained this information for the first layer directly, now the process proceeds to obtain the information for succeeding layers by a modeling procedure. First, different values of velocity for the second layer are assumed. That is, the velocity is successively iterated to $V_{21}$, $V_{22}$, $V_{23}$, and so on. For each velocity, Snell's Law specifies the ray direction in the second layer from:

$\sin \alpha_1 / V_1 = \sin \alpha_2 / V_2$

From the ray direction in the second layer, the dip of the second layer can be computed because the ray strikes the second layer normally. The zero offset time $T_0$ from the field data, and the iterated interval velocity, specifies how thick the second layer is. Now, the travel time for each value of $X$ can be computed for each iterated value of velocity.

Figure 4:
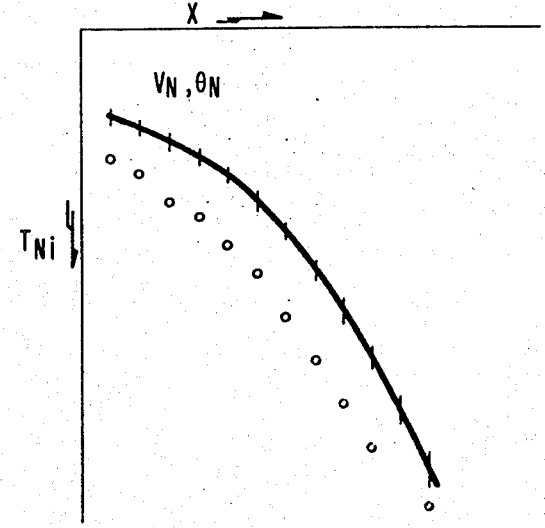
FIG. 4 shows the comparison of observed travel times to computed travel times for one value of velocity.

For example, for the velocity of $V_{21}$, the computed reflection times for each value of horizontal offset are shown by solid line in FIG. 4. These are computed from the well-known migration equations; that is, for each layer, the horizontal displacement of the ray between the top of the interval and the bottom of the interval can be determined. The length of the ray path in each layer is computed and the travel time over the layer is determined using the assumed value of interval velocity.

Figure 5:
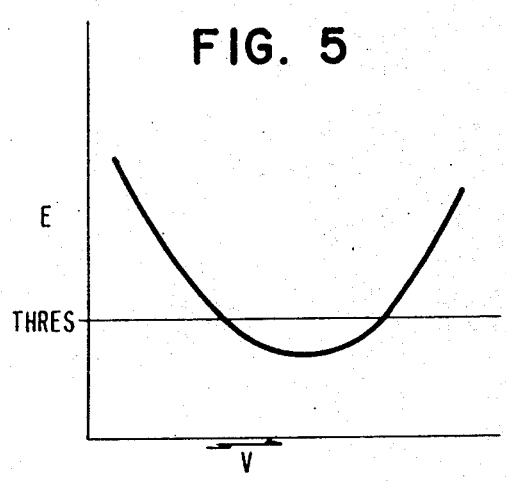
FIG. 5 shows the error function as a function of velocity.

The computed values of travel times $T_{Ni}$ for different values of $X$ are represented by the solid line in FIG. 4. The observed values of reflection time on each of the traces are indicated by the circles in FIG. 4. The sum of the differences between the computed and the observed values of reflection time for each $X$ are summed to produce an error function. That is, the error is:

$$\sum_{i=1}^{m}(T_{Ni}-\hat{T}_{Ni}) \text{ to } \sum_{i=1}^{m}|T_{Ni}-\hat{T}_{Ni}|$$

Where $i$ is the trace index, $m$ is the number of traces in the suite, $T_{Ni}$ is the observed time of reflection $N$ on trace $i$ and $\hat{T}_{Ni}$ is the computed time of reflection $N$ on trace $i$. This error is determined for each of the iterated values of velocity. There will be produced a series of values of the error function for each of the iterated values of velocity. The error function as a function of velocity is shown in FIG. 5. The velocity producing the minimum error is the proper interval velocity. As will be subsequently explained, the minimum is selected by a Newtonian iteration. The minimum specifies the interval velocity for the layer.

Having determined the interval velocity $V_2$ for the second layer, the procedure is repeated for the third layer. Summarizing, with reference to FIG. 3b, the velocities $V_1$ and $V_2$ are now accurately known. The dip of the first and second layers are now accurately known. The zero offset time $T_0$ for the third layer indicates the thickness of the third layer. For an assumed value of velocity, the ray direction in the third layer is given by Snell's Law:

$$\sin \alpha_4 = \sin \alpha_3 \frac{V_3}{V_2}$$

Now, the travel times $T_{Ni}$ through the third layer can be computed for each $X$. The computation of the travel time through the third layer may be in accordance with the equation:

$$T_{Ni} = \sum_{i=1}^{i=1} \frac{D_i}{V_i}$$

Where $D_i$ is the length of the ray in $i^{th}$ layer. $V_i$ is the interval velocity in $i^{th}$ layer. In computing $\hat{T}_{Ni}$, the values of interval velocity and dip $\theta$ are used. The travel times for different values of $X$ are computed for each of a plurality of iterated values of velocity, $V_{31}$, $V_{32}$, $V_{33}$, and so on.

The computed values of $\hat{T}_{Ni}$ are compared with the observed values of $T_{Ni}$ to produce an error function. The minimum in this error function selects the new value of interval velocity.

At this point, it should be noted that the actual process to be subsequently described is a variation on the foregoing. Specifically, the observed reflection times $T_{Ni}$ from the seismogram are not used although this would be the ideal technique. Rather, their equivalent $$\left(\frac{X_i^2}{V_a^2}+T_0^2\right)^{1/2}$$

is used. This term is available for each $X$ as an output of the aforementioned VIP process. It will be seen that the term is related to reflection time by the equation:

$$\frac{X_i^2}{V_a^2}+T_0^2=T_{Ni}^2$$

However, instead of picking all the reflections from the suite of seismograms, it is easier to use the average velocity which is available from the VIP process.

Figure 1:
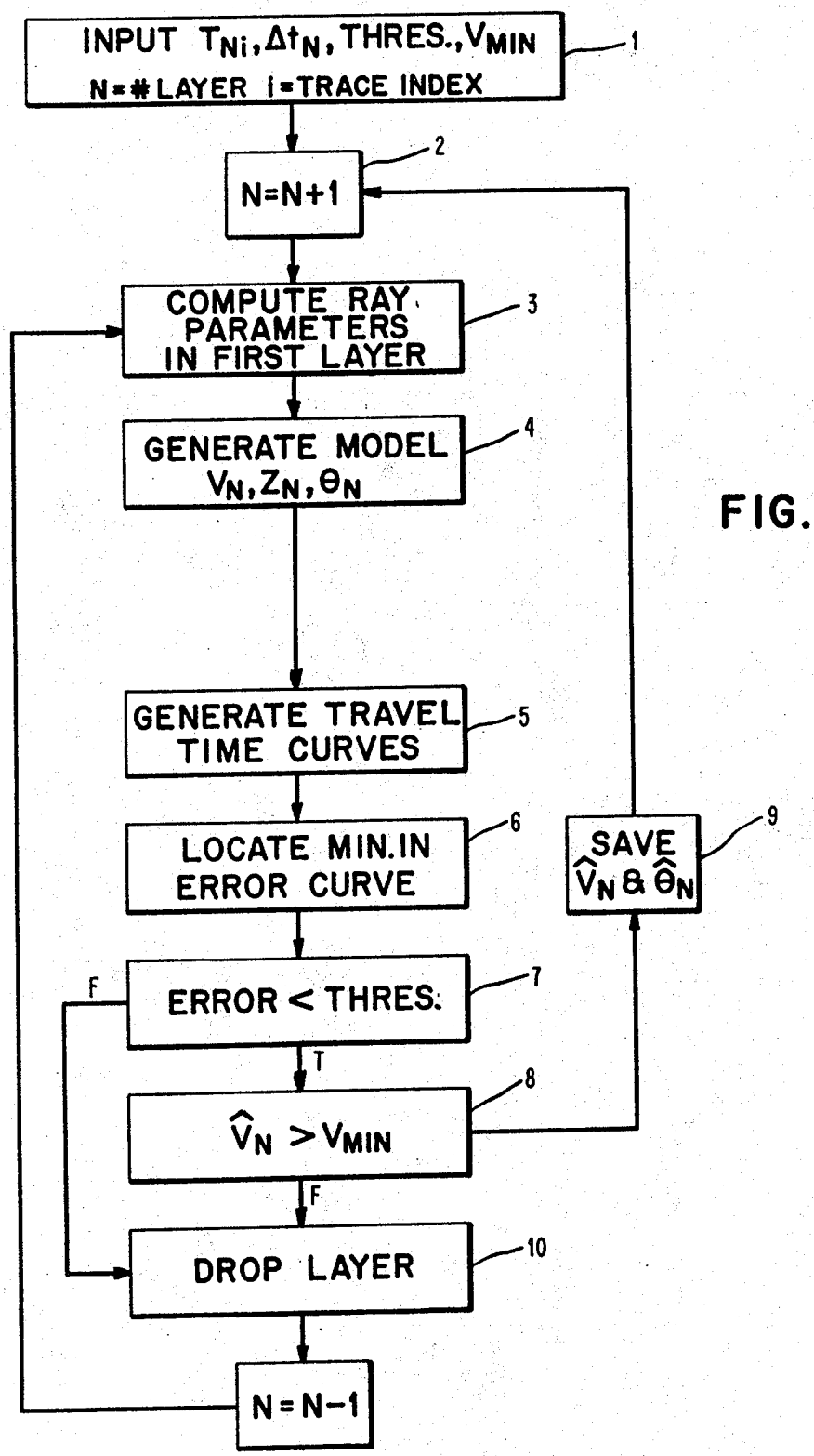
FIG. 1 is a flow sheet depicting the process of the present invention.
Figure 2:
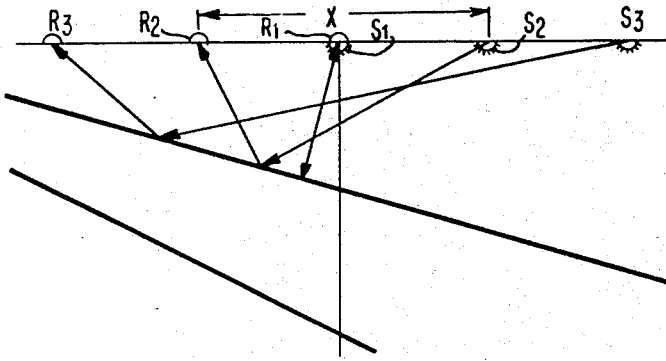
FIG. 2 is a field setup suitable for use in obtaining the field data.

The invention may be better understood from the block diagram of FIG. 1. The input to the process, indicated at 1, includes reflection times $T_{Ni}$ where $N$ is the number of the layer and $i$ is the trace index. As pointed out previously, instead of reflection times, the input to the process may be average velocity from the VIP process. Other inputs to FIG. 1 include $\Delta t_N$, the dip from the VIP process, THRES, the threshold value for the error function, and $V_{MIN}$, the minimum value of interval velocity which will be accepted as being valid.

As indicated at 2, a counter is incremented so that the internal velocities and dips are successively determined for each layer. As previously indicated, it is quite important that an accurate determination of interval velocity for the first layer be obtained. As indicated at 3, the interval velocity for the first layer is determined from the known average velocity and the dip of the first layer.

As indicated at 4, a model is generated with a successive layer being added to the model during each performance of the loop. For each assumed value of interval velocity $V$, Snell's Law specifies the ray direction in the $N$th layer by:

$$\sin \alpha_{2N} = \frac{V_{2N}}{V_{(2N-1)}} \sin \alpha_{(2N-1)}$$

This specifies the dip of the $N$th layer because the ray path strikes the $N$th layer normally.

Having completed the model down through the $N$th layer, the following are known: The zero offset time $T_0$ to the $N$th layer specifies the thickness of the layer. The dips of the $N-1$ layer and all previous layers are known. The interval velocity $V_N$ of the preceding layer and all of the previous layers are known. The dip of the $N$th layer is known from the Snell's Law computation. Now, the travel times $\hat{T}_{Ni}$ can be computed as indicated at 5.

The computed $\hat{T}_{Ni}$ are subtracted from the corresponding $T_{Ni}$'s from the field data to produce an error function. $V_N$ is iterated through successive values to generate an error curve and the minimum in this curve is located by a Newtonian iteration technique indicated at 6. When the minimum error is located, this error is compared to the threshold THRES to determine whether it is less than the threshold. This is indicated at 7. If the error is less than the threshold, then the velocity associated with the minimum error, $\hat{V}_N$, is compared to the minimum acceptable velocity as indicated at 8. If $\hat{V}_N$ is greater than $\hat{V}_{MIN}$, then $\hat{V}_N$ is stored together with the dip of the $N$th layer $\theta_N$ as determined from the Snell's Law calculations. The storage step is indicated at 9.

In this case, the counter 2 is incremented and the same functions are performed for a succeeding layer. If the error threshold comparison at 7, or the minimum velocity comparison at 8, indicates that the determination of velocity has not been satisfactorily made for this layer (that is, there is a false indication from the steps 8 or 9), then this layer is dropped. This is indicated at 10. For example, if the input data from the VIP process indicated that there were four layers, 1, 2, 3, 4, and there was a false indication in the computation for the third layer, then this layer is dropped and the layers are numbered so that the final output will include velocities for layers 1, 2 and 3.

From the foregoing, it will be apparent that the method of the present invention can be practiced with the use of several well-known types of computing apparatus. The method is particularly suitable for use with a general purpose digital computer.

The usefulness of the present invention is best demonstrated with reference to FIGS. 6 through 9.

FIG. 6 is a stacked variable area record section on which the surface layers down to 2.0 seconds all dip to the left. At 1.0 to 1.8 seconds a slight thickening occurs. The reflection labeled "Event A" has zero time dip.

Figure 9:
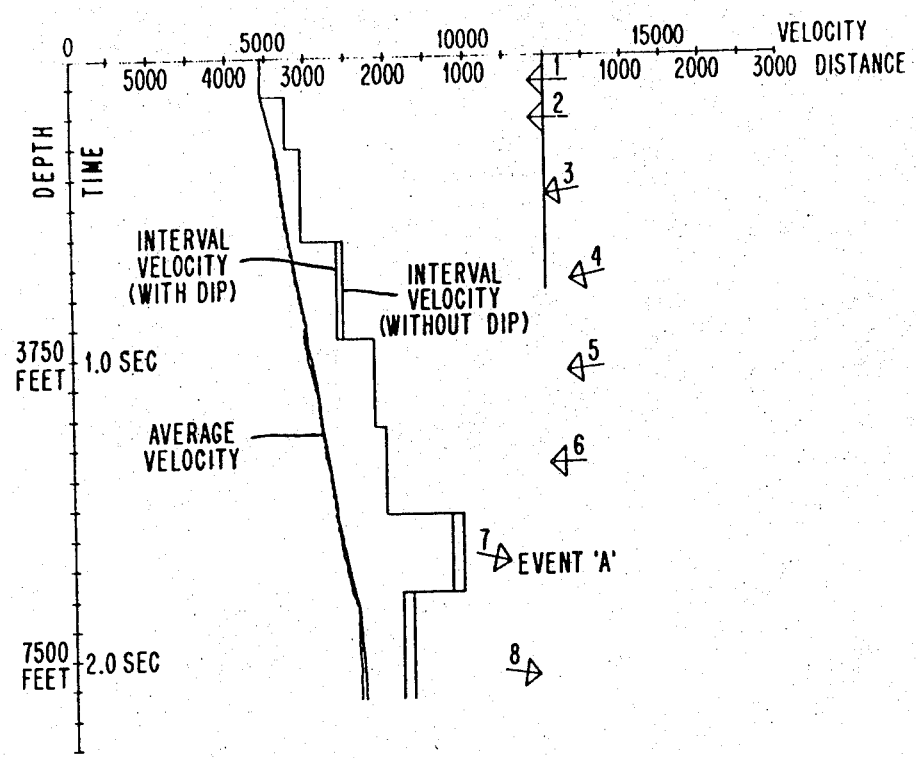
FIG. 9 depicts the output of the process of the present invention.

Field data from the same region was processed in a VIP-type process to obtain the data depicted in FIGS. 7 and 8. The average velocities and the $T_0$'s from this data were used as input to the process of the present invention. The results are displayed in FIG. 9. In FIG. 9, interval velocity was determined in accordance with the present invention both with dip, as previously described, and with an assumption that there was no dip. Both of these interval velocities are plotted in FIG. 9 as a function of record time. Also shown in FIG. 9 are arrows which in this figure locate the migrated events and give their dip attitude. Note that Event A when migrated in spatial coordinates dips to the right thus producing a dip reversal not in evidence on the time section of FIG. 6. The data represented by the above figures is summarized in tabular form below.

SUMMARY WITH DIP

| Two-way time | INT-VEL | DIP | XDIST | YDIST |
|---|---|---|---|---|
| .140 | 4,902 | 0.0 | 0 | 343 |
| .310 | 5,515 | 0.0 | 0 | 812 |
| .620 | 5,893 | 7.9 | 193 | 1,714 |
| .945 | 6,773 | 12.9 | 492 | 2,781 |
| 1.240 | 7,711 | 6.8 | 446 | 3,937 |
| 1.530 | 8,004 | .4 | 220 | 5,115 |
| 1.790 | 9,574 | −16.2 | −681 | 6,295 |
| 2.125 | 8,329 | −9.3 | −329 | 7,743 |

Many modifications of the foregoing will be apparent. For example, in the foregoing the process was described in conjunction with layered modeling and Snell's Law ray tracing. Actually, Snell's Law layered modeling is an approximation, that is, a special case, of ray tracing in a continuously varying medium. In general, Eikonal equations define the ray path in a continuously varying medium. These are described, for example, in "Mechanical Radiation," Lindsay, R. B., McGraw Hill, New York 1960, pages 41–47. As applied to the general case, this invention is applicable to reflecting zones instead of layers and the ray paths are determined from the Eikonal equations instead of Snell's Law.

A three-dimensional process is realized by a simple extension of the above-disclosed process. To the values of $T_0$, $V_a$ and $\Phi$, the value of $\Psi$, the azimuth, is added. These parameters completely specify the elastic layering for the three-dimensional case, as do the three $T_0$, $V_a$, $\Phi$ specify the two-dimensional case. The process is identical in realization to the above process with the substitution of a three-dimensional model subroutine to generate the array of travel times $T_{Nij}$ when $N$ refers to $N^{th}$ layer, $i$ to the $i^{th}$ distance in $X$ direction, $j$ to the $j^{th}$ distance in the $Y$ direction, when $X$ and $Y$ are an arbitrary orthogonal coordinate system on the surface of ground and correspond to the orientation of the areal array.

While a particular embodiment of the invention has been shown and described, it will be understood that various modifications may be made without departing from the true spirit and scope of the invention. The appended claims are, therefore, intended to cover any such modifications.

What is claimed is:

1. The method of accurately determining the interval velocity of each reflecting zone of a subsurface formation from seismic data representing the arrival time and time dip of the seismic reflections on traces obtained along a line of exploration comprising the following steps each performed on automatic computing apparatus:

for a particular reflecting zone $N$, using the time dip of the $N$th seismic reflection to specify the ray path in the upper reflecting zones, determining the ray path in the $N$th reflecting zone to determine the dip of the $N$th reflecting zone, generating a computed representation of arrival time for a plurality of assumed values of interval velocity $\hat{V}_N$ and for a plurality of points $X$ along said line of exploration, comparing said computed representation of arrival time with the representation of arrival time from said seismic data for each assumed value of interval velocity, picking the value of interval velocity producing the least error in the foregoing step, and iterating the above steps for successive reflecting zones of said formation.

2. The method of accurately determining the interval velocity of each layer of a subsurface formation from seismic data representing the arrival time and time dip of the seismic reflections on traces obtained along a line of exploration comprising the following steps each performed on automatic computing apparatus:

for a particular layer $N$, using the time dip of the $N$th seismic reflection to specify the ray path in the upper layers, determining from Snell's law at the $N-1$ interface the ray path in the $N$th layer to determine the dip of the $N$th interface, generating a computed representation of arrival time for a plurality of assumed values of interval velocity $\hat{V}_N$ and for a plurality of points $X$ along said line of exploration, comparing said computed representation of arrival time with the representation of arrival time from said seismic data for each assumed value of interval velocity, picking the value of interval velocity producing the least error in the foregoing step, and iterating the above steps for successive layers of said formation.

3. The method recited in claim 2 wherein said representation of arrival time from the seismic data include average velocity of each reflection and wherein average velocity is computed for each assumed value of interval velocity and compared with the representations from said seismic data.

4. The method recited in claim 2 wherein said representations of arrival time from the seismic data include the arrival time of each reflection $T_M$ and wherein reflection time $\hat{T}_M$ is computed for each assumed value of interval velocity and compared with the representations from said seismic data.

5. The method recited in claim 2 wherein the step of determining the ray path in the Nth layer is computed in accordance with the following:

$$\sin \theta_N = \frac{V_N}{V_{N-1}} \sin \theta_{N-1}$$

where $\theta_N$ is the dip of the Nth interface, $V_N$ is the assumed value of interval velocity for the Nth layer, $V_{N1}$ is the interval velocity determined from a previous iteration of the above steps and $\theta_{N11}$ is dip of the N−1 interface determined from an iteration of the above steps.

6. The method of accurately determining the interval velocity of each reflecting zone of a subsurface formation from seismic data representing the arrival time and time dip of the seismic reflections on traces obtained along an area of exploration comprising the following steps each performed on automatic computing apparatus:

for a particular reflecting zone N, using the time dip of the Nth seismic reflection to specify the ray path in the upper reflecting zones, determining the ray path in the Nth reflecting zone to determine the dip and azimuth of the Nth reflecting zone, generating a computed representation of arrival time for a plurality of assumed values of interval velocity $V_N$ and for a plurality of points X, Y over said area of exploration, comparing said computed representation of arrival time with the representation of arrival time from said seismic data for each assumed value of interval velocity, picking the value of interval velocity producing the least error in the foregoing step, and iterating the above steps for successive reflecting zones of said formation.

PO-1050
(5/69)

UNITED STATES PATENT OFFICE
CERTIFICATE OF CORRECTION

Patent No. 3,611,278            Dated October 5, 1971

Inventor(s) Norman J. Guinzy and William H. Ruehle

It is certified that error appears in the above-identified patent and that said Letters Patent are hereby corrected as shown below:

Column 1, line 6, "internal" should be --interval--.
Column 4, lines 1-4, the material shown within the quotation marks (" ") should be deleted; and also delete "to";
        line 6, after "and" change " $T_{Ni}$ " to -- $\hat{T}_{Ni}$ --;
        line 27, " $T_{Ni}$ " should read -- $\hat{T}_{Ni}$ --;
        lines 31-34, that portion of the equation reading " $T_{Ni}$ " should read -- $\hat{T}_{Ni}$ --.

Column 5, line 32, " $\hat{V}_{MIN}$ " should read -- $V_{MIN}$ --;
        line 33, " $\theta_N$ " should read -- $\hat{\theta}_N$ --.

Column 7, line 25, " $V_{N11}$ " should read -- $V_{N-1}$ --.

Column 8, line 2, " $\theta_{N11}$ " should read -- $\theta_{N-1}$ --;
        line 16, " $V_N$ " should read -- $\hat{V}_N$ --.

Signed and sealed this 28th day of March 1972.

(SEAL)
Attest:

EDWARD M. FLETCHER, JR.          ROBERT GOTTSCHALK
Attesting Officer                  Commissioner of Patents